Patented June 23, 1925.

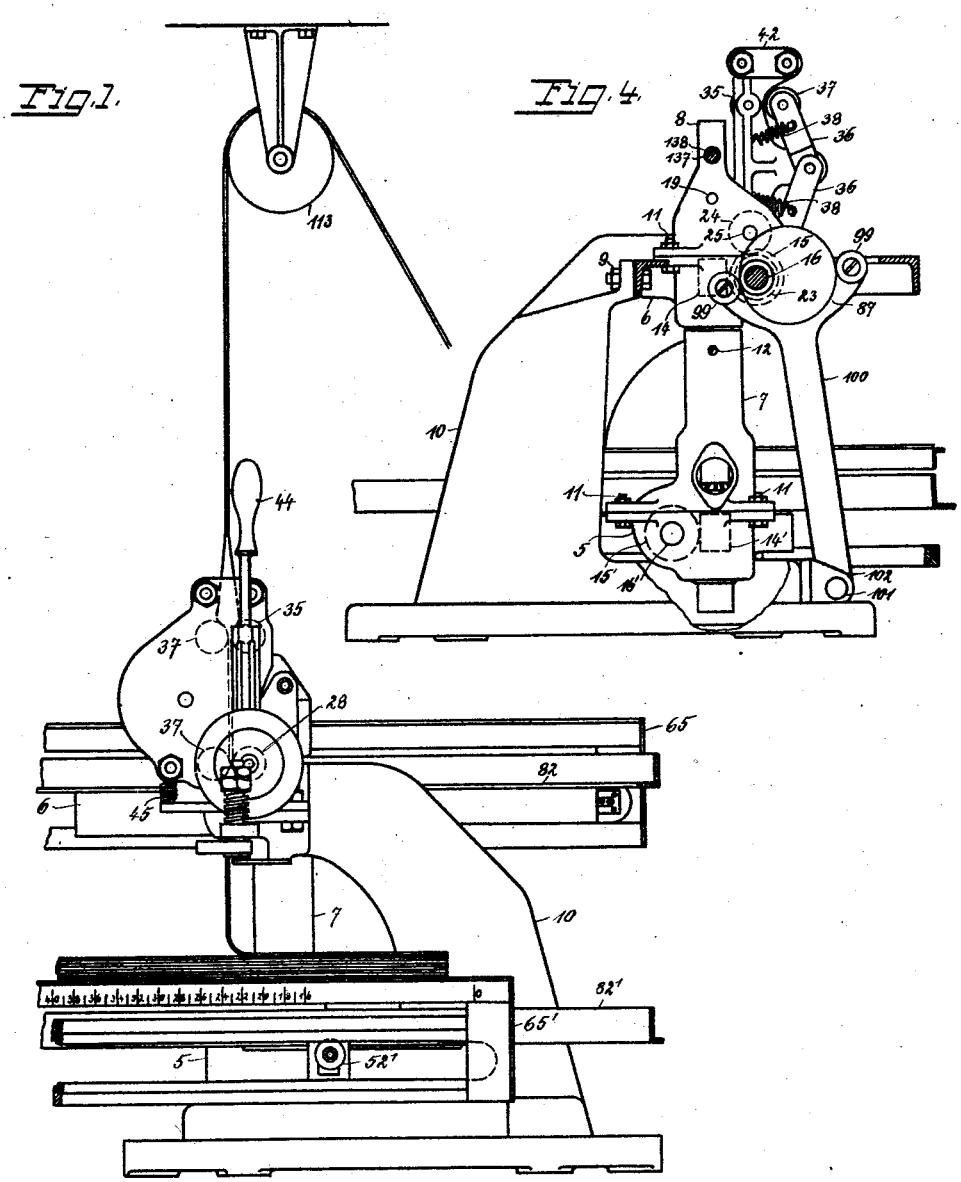

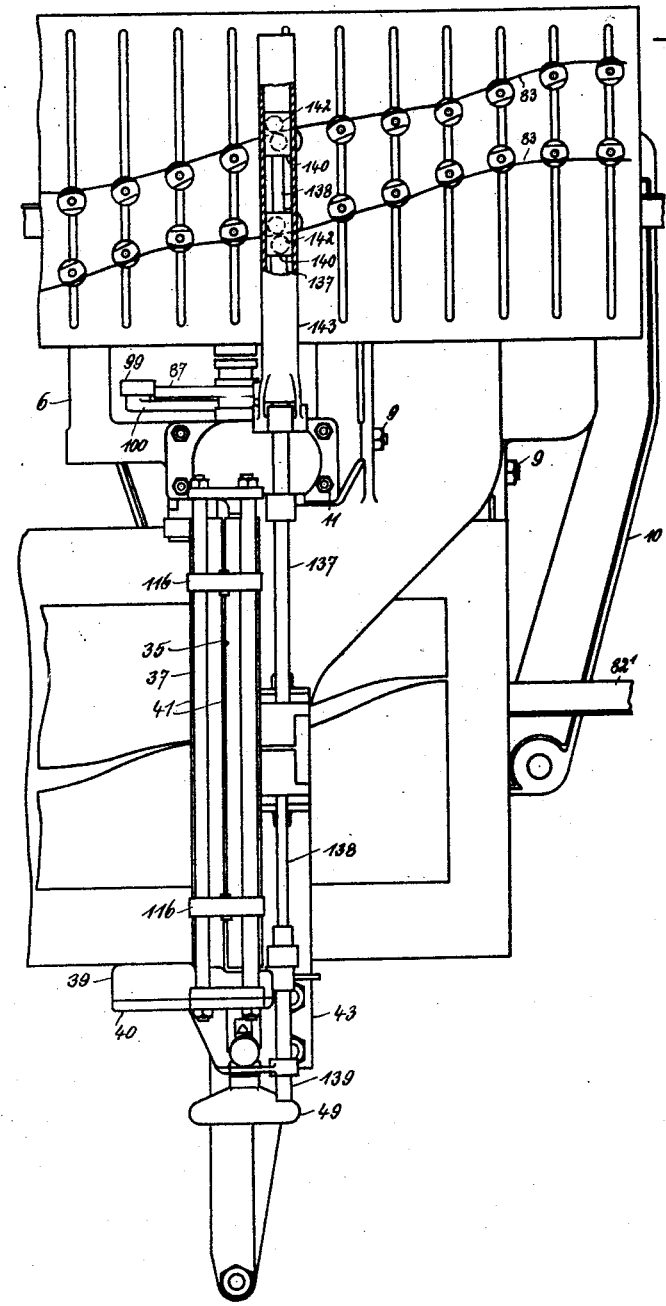

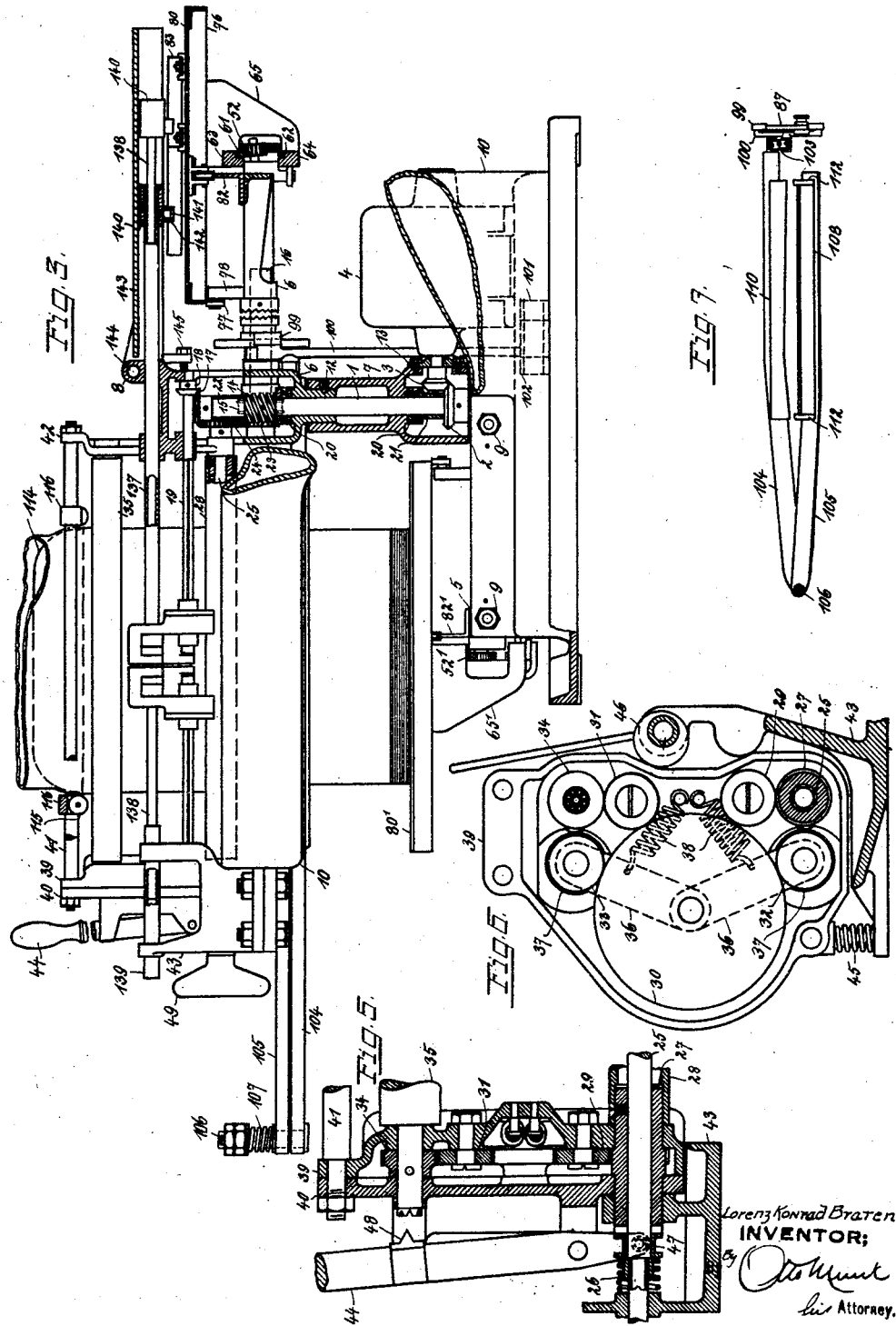

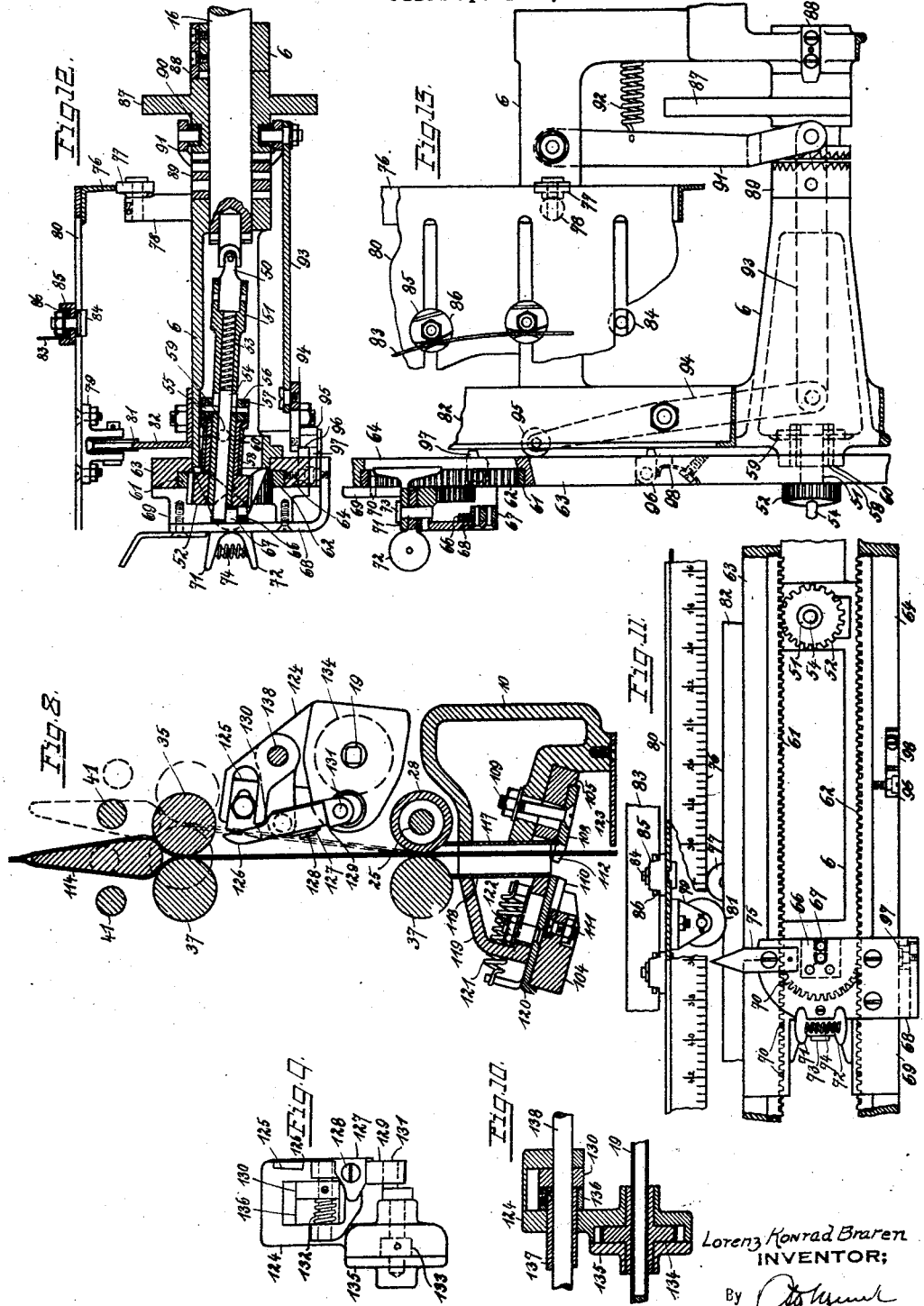

1,543,203

UNITED STATES PATENT OFFICE.

LORENZ KONRAD BRAREN, OF MUNICH, GERMANY.

AUTOMATIC CUTTING MACHINE.

Application filed April 11, 1922. Serial No. 551,706.

*To all whom it may concern:*

Be it known that I, LORENZ KONRAD BRAREN, a citizen of Germany, residing at Munich, in the Free State of Bavaria, Germany, have invented new and useful Improvements in Automatic Cutting Machines, of which the following is a specification.

This invention is a machine for automatically cutting out designs of any desired form or size in large quantities, where a bolt of material is passing through the machine while one or more cutting heads are being moved crossways to the travel of the material the said cutting heads being actuated by patterns located on a reciprocating table.

The invention comprises as a very important part mechanisms for changing easily the length of the movement of the reciprocating table, for changing readily the form of the pattern, for actuating the transverse cutting knife in proper relation to the design being cut without any further adjustments, for reducing the pressure on the transverse cutting knife, for bringing the material in or out of the path of the design cutting knives, and for interrupting the feed of the material when desired.

I attain my object by the arrangement of the several parts as more fully hereinafter described and shown on the accompanying drawings.—Figure 1 is a front elevation of the machine.—Fig. 2 is a top plan view partly in section. Fig. 3 is an elevation of the right hand end of the machine, partly in section. Fig. 4 is a rear view of the machine with the pattern table and driving motor removed. Fig. 5 is a detail sectional view through the right hand feed rollers looking from the right hand side of the machine. Fig. 6 is a front view of the mechanism shown in Figure 5 after the removal of the cover plate. Fig. 7 is a top plan view of the transverse cutting knife. Fig. 8 is a section through the feed rollers and the transverse cutting knife and also shows a design cutting head. Fig. 9 shows a design cutting head, looking from the left hand side of the machine. Fig. 10 is a section of the design cutting head on the center lines of the shafts, looking in the same direction as in Fig. 9. Fig. 11 shows the pattern table, looking from the rear end of the machine. Fig. 12 is a sectional side view of the pattern table, looking from the left hand side of the machine. Fig. 13 is a top plan view of the pattern table, partly in section.

Referring to the drawings, the main shaft 1 (Fig. 3) is rotated by an electromotor 4 through the bevel gears 2 and 3. The shaft 1 is mounted in bearings of a housing consisting of four parts, the bracket 5 for the work stacking table, the bracket 6 for the pattern table, the connecting member 7, and a top piece 8. The brackets 5 and 6, the tables mounted on them, and the means for actuating them are identical. Therefore similar parts are indicated by similar reference characters. For clearer distinction however the respective parts of the work stacking table have been provided with an indicator. It will therefore be sufficient to describe the pattern table only.

Screws 9 (see also Fig. 2) fasten the brackets 5 and 6 to the main frame 10. Screws 11 connect the parts 5 and 7 as well as 7 and 8 of the housing with each other. The bracket 6 fits into the connecting member 7 and is held in place by a set screw 12. The bearing plate 13 takes up the thrust of the bevel gear 3 and also closes the opening in the housing. The worms 14 and 14', rigidly mounted on the main shaft 1, engage with worm gears 15 and 15' which are fastened on the table actuating shafts 16 and 16' (see also Fig. 4). The bevel gear 17 is also rigidly mounted on the main shaft 1 and is in mesh with the bevel gear 18, which is fastened to the shaft 19 actuating and supporting the design cutting head. The two ball bearings 20 take up any end thrust. The tubular parts 21 and 22 keep the various gears and bearings at the proper distance. A gear 23 is fastened, close to the worm gear 15, on the front end of the pattern table actuating shaft 16, and meshes with another gear 24 rigidly mounted on the shaft 25 (see also Fig. 4).

The said shaft 25 (Fig. 5) is set off square for a short distance near the front end, and a bushing 26 fits slidingly over this portion. One end of this bushing 26 is cut with clutch teeth, which can be brought into engagement with similar clutch teeth on another bushing 27 which is rigidly secured in the lower stationary tubular feed roller 28. The bushing 27 is formed in its central portion as a gear and meshes with gear 29 which is in engagement with the large gear 30 (Fig. 6). Gear 30 is in mesh with the gears 31, 32 and 33. The gear 31 drives another gear 34 fastened rigidly to a turned down portion of the upper stationary feed roller 35. The gears 32 and 33 are fastened to the two loose feed rollers 37, which are mounted in bearings of the two levers 36. These levers are pivoted on the same stud with gear 30 and in this way the two gears 32 and 33 are kept in mesh with gear 30. The springs 38 pull the loose feed rollers 37 against the fixed feed rollers 28 and 35. The loose feed rollers 37 are supported at their rear end in a similar manner (see Fig. 4) and similar parts are indicated by similar reference characters.

The result of this disposal and arrangement of parts will be a uniform tensile effect of the feed rollers, even with material of unequal thickness passing through.

The gears 29 to 34 inclusive are encased in the gear box 39 with the cover 40 (Figs. 5 and 6). The gear box 39 provides also a bearing for the upper feed roller 35. A pair of rods 41 with nuts keep the gear box closed and in rigid connection with the rear bracket 42. This bracket is rotatably mounted on the shaft 25 (Fig. 3). In the same way the gear box 39 forms a bearing over the bushing 27, and the bushing 27 is rotatably supported in an arm of the bracket 43, while another arm of the same bracket forms a bearing for the reduced front end of the shaft 25 (Fig. 5). Thus the whole feed roller drive together with the material held between the feed rollers may be swung about the shaft 25 as axle and the material may be brought within or removed from the path of the permanently operating knives of the design cutting head or heads (Fig. 8).

A lever 44 (Fig. 1) is located between four lugs of the cover 40. The design cutting operation can be interrupted by a lateral pressure against the handle of this lever. Ordinarily a spring 45 keeps the feed roller drive in cutting position (indicated by dotted lines on Fig. 8) but may be made inactive by turning the eccentric roller 46 (Fig. 6).

Two rollers 47 (Fig. 5) are rotatably attached to the lower end of the lever 44 and fit slidingly into a groove of the bushing 26. By moving the handle of the lever 44 towards the rear the bushing 27 is uncoupled from the bushing 26 and the constantly rotating shaft 25, and the feed rollers are brought to a standstill. To prevent any movement of the free feed rollers there is attached to the lever 44 a detent 48, which engages with teeth cut into the end of the turned down portion of the feed roller 35 as soon as bushing 26 has been uncoupled from bushing 27. A hand wheel 49 (Fig. 3) fastened to the end of the shaft 25 permits the turning of the machine when the driving power is shut off.

The pattern table actuating shaft 16 (Figs. 11, 12 and 13) which is rotatably mounted in the table bracket 6 drives a hollow shaft 51 by means of a universal joint 50. A pinion 52 is fastened to the other end of the shaft 51. A spring 53 located in the bore of this shaft exerts a certain pressure upon the bolt 54. A pin 55 slides in slots of the shaft 51 and is fastened in the bolt 54 and also in the rings 56 and 57 which fit slidingly on the shaft 51. The bushing 58 is held rotatably by its shoulder to the rings 56 and 57 and is rigidly connected with the sleeve 60 through two pins 59. The sleeve 60 is prevented from turning by lateral faces and fits slidingly in a corresponding recess of the bracket 6, in this way being only free to move up and down. The spring 53, acting through the bolt 54, the pin 55, and the bushing 56 onto the bushing 58, presses the two pins 59 into corresponding grooves of the bracket 6, in this way securing the proper meshing of the pinion 52 with the racks 61 or 62. The racks 61 and 62 are fastened respectively to rack supports 63 and 64. Plates 65 connect rigidly the rack supports with each other and with the ends of the table (Figs. 1 and 3).

To reverse the movement of the pattern table it is necessary to move the pinion 52 from engagement with one rack to engagement with the other. This is attained by reversing means secured to the said racks or their supports, one of these reversers being immovably attached at one end of the table, while the other is movable and can be adjusted according to the length of the piece to be cut. Whenever the respective reversing device arrives at the pinion 52, the plate 66 pushes the bolt 54 with a bevelled portion out of the way and moves thereby the pins 59 out of the locking grooves on the bracket 6. The sleeve 60 which is now free to move up or down is restrained in this movement by a block 67 of trapezoid cross-section with a rounding at one end, the bolt 54 acting as a guide against the side of this block. The plate 66 as well as the block 67 are attached to the supporting plate 68 which, in turn, is fastened to the reversing piece 69 by means of screws. On this reversing piece 69 teeth are cut leading in semicircle from one rack to the other, the several teeth being worked out in an angle to correspond to the respective position of the pinion shaft 51. The centers of the rounding of the block 67 and of the internal gear coincide. The pinion 52 is wide enough to engage as well with the racks 61 and 62 as with the internal gear teeth of the reversing piece 69. The pinion will roll off on the latter until it meshes with the other rack and moves this rack together with the table in the opposite direction. During this operation the bolt 54 bears against the rounding of the block 57 and secures proper meshing of the teeth. When leaving the reversing device the bolt 54 actuated by the spring 53 moves outward on a second bevelled portion of the plate 66 until the pins 59 snap into the respective grooves. The pinion 52 now remains in engagement with this rack until the whole proceeding is repeated in the other reversing device.

A few pins 70 fastened in the movable reversing device fit into the toothspaces of the racks and ensure the proper correspondence of the teeth of the internal gear 69 with the racks 61 and 62. For holding this movable reversing device to the racks there are provided two nipper like fingers 71 and 72 which are pivoted on the pin 73 and catch with their curved portions behind the racks, being held apart by a spring 74. An indicator 75 is fastened to the supporting plate 68, a measuring scale on the frame 76 of the table proper facilitating an adjustment to any other length.

The table is supported by a pair of rollers 77 which are pivoted on bolts 78 secured to the bracket 6 and by another pair of rollers 81 turning in bearings 79 fastened to the table 80. The rollers 81, guided laterally by flanges, run on the upright leg of the angle 82 fastened to the table bracket 6. The rack supports 63 and 64 are guided on suitably prepared faces of the bracket 6.

So far pattern and work stacking table are alike and differ only in size of the table proper. Some additional features are provided on the pattern table. A number of slots are cut into the table 80 and the bolts 84 fit with milled off sides into these slots. The disc 85 and the washer 86 turn on the bolt 84 and clamp the pattern band 83 which is made of elastic material, for instance spring steel, in order to assume various pattern forms. Yet, when fastened in the various holding points, the band is stiff enough not to deflect under the pressure of the design cutting heads. On tightening the nut, the washer 86 slides down the inclined side of the disc 85, presses the pattern band 83 against the other projection of the disc 85 and clamps the whole fast upon the table 80. The washer 86 and the projection of the disc 85 in touch with the pattern band are rounded off in such a way that the band may assume any required curvature. In case that only a few different designs are to be cut with a machine, solid pattern plates may be fastened on the table 80 instead of the adjustable pattern band described.

There is furthermore attached to the pattern table a mechanism which releases at the proper moment the transverse cutting device for cutting off the material. A cam disc 87 is mounted loosely upon the pattern table actuating shaft 16. The hub on one side of this cam has a notch cut into it. A tooth 88, fastened to the bracket 6, fits into this notch and prevents ordinarily a rotation of the cam 87. Clutch teeth are cut into the face of the hub on the opposite side of the cam, corresponding with similar teeth cut into a collar 89 rigidly fastened to the shaft 16. The rollers 90 fitting into a groove of the hub of the cam disc 87 are pivoted to the lever 91 which is rotatably mounted on a bolt secured to the bracket 6. A spring 92 keeps the cam 87 out of engagement with the rotating tooth clutch 89. The link 93 connects jointedly the lever 91 with one arm of a lever 94 pivoted to the table bracket 6. The roller 95 pivoted to the other arm of this lever is located in the path of two small levers with a toothlike projection, one of these levers 96 being pivoted to the lower rack support 64, while the other lever 97 is pivoted to the movable reversing device in such a way that both levers may pass by and over each other, yet both be in a position to actuate the roller 95. Springs 98 hold the levers 96 and 97 against faces of the recesses in which they are located. Whenever by the movement of the table one of the levers is carried from one side past the roller 95, this roller will push the lever 96 or, respectively, 97 aside because the spring 92 is stiffer than the spring 98. If, however, this lever 96 or 97 comes from the other side, it will bear against the face of the recess and push the roller 95 out of the way, thereby actuating lever 91 through the lever 94 and the link 93. The rollers 90 withdraw the cam 87 from engagement with the tooth 88 and slide the clutch teeth on the opposite face into mesh with the collar 89, and the cam 87 starts rotating. The full face of the hub of the cam 87 bears now against the end of the tooth 88 preventing thus the return of the cam 87 to its normal position until one revolution has been completed. The notch in the hub coincides now again with the tooth 88, and the pull of the spring 92 snaps the cam 87 back to the original position where it is held stationary until released again by the action of the levers 96 or 97.

The roller 95 and the levers 96 and 97 should be positioned in such a way that from the moment of the reversal of the table to the commencement of the cutting operation the same period of time will be consumed as the material requires on its path from the design cutting knives to the transverse cutting device so that the cut across the material will always coincide with the point of the reversal of the design.

The rotating cam 87 actuates the lever 100 through rollers 99 (Fig. 4). This lever 100 is fastened on the pin 101 which turns in a bearing 102 secured to the main frame 10. A connecting piece 103 with a universal joint at each end connects the lever 100 with the knife lever 104 (Fig. 7). The knife lever 104 carries the loose transverse cutting knife 110 and is pivoted on the bolt 106 to the end of the knife support 105 to which the stationary knife 108 is fastened. A spring 107 with adjustable tension presses the two levers together (Fig. 3). On the opposite end a similar tension is produced by disposing the cutting mechanism in oblique position to the pull from the lever 100 (Fig. 8). Bolts 109 fasten the stationary knife 108 and its support 105 to the horizontal arm of the main frame 10. Bolts 111 attach the movable knife 110 to the knife lever 104. To reduce the distance through which the knife has to move for completing a transverse cut shear has been provided from both ends (Fig. 7). To guide the knife blades into contact with each other there are provided on both ends of the stationary knife 108 guiding pieces 112 upon which the knife 110 slides until it gets in touch with the cutting edge of the blade 108. To attain an easy cut the stationary blade 108 is placed at an angle to the direction of the cut and the movable knife blade 110 is recessed a small distance in back of the cutting edge.

The material to be cut may be guided over a roller 113, mounted in brackets which are fastened to the ceiling of the room (Fig. 1), and in case of tubular fabric it is brought to a uniform width by a spreader 114 (Figs. 3 and 8). The spreader is guided laterally by means of two rollers 115 which are mounted on brackets 116 adjustably fastened to the rods 41. The material thereupon passes through the two pairs of feed rollers into a channel which is formed by two plates 117 and 118 of which the former is secured to the main frame 10 and the latter to a bridge 119 which in turn is bolted to the frame 10 (Fig. 8). The plates bear with their upper edges against the lower feed rollers 28 and 37. A gripper 120, which is held by the springs 121 against the knife lever 104, serves for holding the material during the cutting operation. The fore edge of the gripper 120 protrudes somewhat beyond the knife blade 110 and clamps the material upon the plate 117 before the knife starts cutting. The bolts 122 are fastened in the gripper 120. They slide in slots of the bridge 119 and guide the gripper 120 by means of nuts and washers. To prevent irregular stacking of the cut off pieces, a dash plate 123 is fastened to the frame 10 underneath the transverse cutting device.

The detached pieces are laid up on the reciprocating stacking table (Fig. 1) which is accessible on front and on both ends facilitating the easy removal of the cut pieces without interrupting the operation of the machine.

A design cutting head consists of the frame 124 (Figs. 8, 9 and 10), a knife blade 125 adjustably secured thereto, a movable knife blade 126 held to a knife carrier 129 by means of a clamp 127 and a screw 128, a swinging lever 130 guiding the knife carrier 129 and a crankshaft 131 imparting to one end of the knife carrier 129 a rotating movement. The swinging lever 130 is disposed in such a way that the cutting portion of the movable knife blade 126 describes approximately a circular or elliptic curve. A spring 132 presses the movable knife blade 126 against the stationary knife blade 125. The crankshaft 131 is rotated by a gear 133 in mesh with another gear 134 driven by the shaft 19.

Both gears are running in recesses of the frame 124 and are enclosed by the cover 135. The gear 134 has a square bore on which the shaft 19 fits easily so that the gear can slide readily on the shaft. The shaft 19 is mounted on the rear in bearings of the top piece 8 and on the front in the bracket 43, (Fig. 3).

A collar 136 is fastened by a set screw to the sliding tube 137 and through this tube the one design cutting head is moved backwards and forwards (Fig. 10). The second design cutting head is fastened in a similar manner to the sliding rod 138. The collar 136 is located sideways between the frame 124 and the swinging lever 130 which on the opposite side bears against an arm of the frame 124. The sliding rod 138 is supported on the front end of the machine in a tubular sleeve 139 which is fastened in the bracket 43 (Fig. 3). The tube 137 with the rod 138 sliding in its bore back and forth is slidably mounted in bearings of the top piece 8. On the rear end of the rod 138 and of the tube 137 there are rigidly fastened to them two roller brackets 140. Two rollers 142 are fastened by stud screws 141 to each bracket 140. These rollers 142 are disposed one on each side of the pattern band 83 at an angle to the shaft to correspond with the average inclination of the pattern (Fig. 2). A guiding arm 143 pivoted on a pin 144 and resting with the screw 145 against the top piece 8 serves for guiding the roller brackets 140 sideways (Figs. 2 and 3). Whenever the pattern band is to be adjusted it is of advantage to swing the guiding arm 143 upwards past the vertical line, to turn the roller brackets 140 in order to disengage the rollers 142 from the pattern band 83 and to shove the roller brackets out of the way.

The operation of the machine is as follows: The end of a new bolt of material is laid over the roller 113 and in case of tubular fabric stripped over the spreader 114 and then held between the rotating upper feed rollers 35 and 37. These grip and forward the material until it is caught by the lower rollers 28 and 37. During this operation the feed roller drive is held by the eccentric roller 46 in the noncutting position (full lines in Fig. 8) and the material is out of the path of the circulating design cutting knives 126.

In order to make as little waste as possible at the beginning of each new bolt of material it is necessary to effectuate the first transverse cut close to the end. For this reason the operator as soon as the lower pair of feed rollers have caught the material presses back the lever 44 and interrupts the feeding until the pattern table reverses. The line on which the material will be cut is now on the level of the design cutting heads and these actuated by the pattern band 83 stand in position corresponding to one end of the part to be cut. The operator turns at the same time the eccentric roller 46 and the spring 45 swings the feed rollers towards the design cutting head. The points of the design cutting knives 126 enter now into the material held tight between the four rollers 28, 37 and 35, 37 and cut in cooperation with the lower stationary knife blades 125 the material into strips, while the design cutting heads guided by the pattern on the table move back and forth. The peripheral speed of the feed rollers being the same as the speed of the pattern table the design cut by the knives must with inelastic material correspond to the pattern. The table speed however may be chosen faster or slower as the peripheral speed of the feed rollers and a correspondingly elongated or shortened pattern laid out on the table. For instance with elastic material passing through the machine in stretched condition, the peripheral speed of the feed rollers should be somewhat greater than the speed of the pattern table to correspond to the extended length of the material.

After passing between the lower feed rollers the material suspends freely in the slot formed by the plates 117 and 118 (Fig. 8) until it touches the stacking up table and is taken along by the same. To attain an even stacking up of the pieces it is necessary to have the stacking up table move at about the same speed at which the material is being fed. During the movement of the pattern table in one direction the design is transferred upon the material in one way and during the movement in the other direction in the opposite way. It is therefore necessary to pile the detached pieces alternately in opposite directions and this object is attained by giving the stacking up table the same movement as the pattern table except that the moment of reversion is different owing to the distance from the design cutting head to the stacking up table.

The transverse cutting device is actuated by the pattern table after each reversal. The gripper 120 holds the material during the cutting operation. The material fed during this time collects in the slot formed by the plates 117 and 118. The knife 110 detaches the material quickly and imparts to the detached piece a blow which would hinder a smooth laying up on the stacking up table. The dash plate 123 therefore catches the cut off end, breaks the force of the blow and permits the piece to slide smoothly on the still moving table.

After starting the end by hand a bolt of material is cut out and stacked up entirely automatically. If for any reason as on account of holes or stains, which would cause spoiled pieces, it is desired to pass a portion of the material without cutting it into strips the operator by using the lever 44 may interrupt at any time the design cutting and also, if required, the feeding of the material.

To cut out a design of any other shape or length the pattern is adjusted correspondingly and the distance of the movement of the pattern and stacking up tables changed by adjusting the movable reversing devices 66 to 69 and 66' to 69' so that the indicators 75 and 75' point to the respective marks on the scales. I wish it to be understood that I do not desire to be limited to the exact details of construction shown and described for obvious modifications will occur to a person skilled in the art.

What I claim is:

1. In a cutting machine means for feeding the material through the machine, form cutting means for cutting the material into strips according to the design, a transverse cutting mechanism for cutting the material off crossways, a reciprocating pattern table with a master pattern thereon for guiding the said form cutting means and means for actuating these mechanisms.

2. In a cutting machine means for feeding the material through the machine, form cutting means, movable transversely to the feed of the material, a reciprocating table, and an adjustable pattern on said table for controlling the movement of said form cutting means.

3. In a cutting machine means for feeding the material through the machine, form cutting means operable on the material feeding through the machine and movable approximately at right angles to the feeding direction, a reciprocating table, clamps adjustable on said table, and a flexible tape held rigidly by said clamps to said table, said tape controlling the movement of said form cutting means.

4. In a cutting machine means for feeding material through the machine, form cutting means movable transversely to the feed of the material, a reciprocating table, adjusting means located movably on said table, and a flexible pattern for controlling the movement of said form cutting means, said pattern arranged to be adjusted to various shapes by said adjusting means.

5. In a cutting machine means for feeding the material through the machine, form cutting means for cutting the material into strips, a reciprocating table, a pattern thereon and connecting members between said pattern and form cutting means.

6. In a cutting machine means for feeding the material through the machine, a plurality of form cutting means movable crossways to the travel of the material through the machine, a reciprocating table, a plurality of patterns fastened thereon and a plurality of connecting members between said patterns and form cutting means.

7. In a cutting machine a reciprocating table, two racks fastened to said table, a rotating pinion meshing alternately with said racks, a fixed reversing device, an adjustable reversing device, both for leading said pinion from one rack to the other, and holding means for keeping said pinion in proper engagement with said racks.

8. In a cutting machine a reciprocating table, two racks fastened to said table, a pinion disposed between said racks, one fixed and one adjustable reversing device, with gear teeth cut on both reversing devices in semicircle for guiding the pinion from one rack to the other rack, holding means for keeping the pinion meshing correctly with said racks and different holding means for keeping said pinion in engagement with said reversing devices.

9. In a cutting machine a reciprocating table, two gear racks on said table, a pinion engageable with either rack, an adjustable reversing device and means for locating said adjustable reversing device in proper relation to said racks.

10. In a cutting machine a reciprocating table, gear racks fastened to said table, a gear disposed between and engageable with either of said racks, a fixed and an adjustable reversing device and indicating means showing the length of movement of said tables.

11. In a cutting machine a table, gear racks fastened to said table, a gear disposed between said racks, engageable with either rack, a stationary reversing device, an adjustable reversing device and indicating means fastened to the adjustable reversing device, in conjunction with a scale on said table.

12. In a cutting machine a master pattern for moving the form cutting means transversely to the feed of the material, a table for carrying the master pattern, racks fastened to said table, a driving pinion disposed between the racks, engageable with either rack, and reversing devices.

13. In a cutting machine a reciprocating table carrying a master pattern, form cutting means guided by said master pattern and a second reciprocating table for receiving the cut pieces.

14. In a cutting machine a reciprocating table with a pattern fastened to it for guiding the form cutting means and a second reciprocating table for receiving the cut pieces substantially identical with the said pattern table.

15. In a cutting machine means for feeding the material through the machine, form cutting means, a transverse cutting mechanism for cutting the pieces to length after the form cutting means have cut the material into strips according to the desired design, a reciprocating table for the master pattern, another reciprocating table for receiving the cut pieces and means for actuating these various mechanisms.

16. In a cutting machine form cutting means guided by a master pattern, material feeding means, a transverse cutting mechanism for cutting off the material after it has been operated upon by the form cutting means, tripping means connected to the master pattern and connecting members between said tripping means and the transverse cutting knife, said tripping and connecting means being disposed so as to avoid adjustment for different lengths.

17. In a cutting machine a pattern table, tripping means actuated by the movement of said pattern table a certain distance after the point of reversal and a transverse cutting mechanism set in motion by the tripping means.

18. In a cutting machine tripping means actuated by the movement of a reciprocating table, a rotating member, and a cam thrown into engagement with said rotating member by the said tripping means.

19. In a cutting machine a reciprocating pattern table, tripping levers carried by the said pattern table, a rotating clutch, a cam thrown into engagement with said rotating clutch by the said tripping means and means for arresting the movement of the cam after one revolution has been completed.

20. In a cutting machine, a reciprocating table, a rotating member, tripping means actuated by the movement of said reciprocating table, a cam thrown into engagement with said rotating member by the said tripping means and means for keeping said cam for one revolution in engagement with the said rotating member.

21. In a cutting machine form cutting means, a feed roller system, arranged in a unit, turnable about an axis, and means for swinging the material held in this feed roller system in or out of the path of the form cutting means.

22. In a cutting machine two sets of feed rollers disposed in a unit, turnable about an axis, form cutting means arranged to be operable upon the material held between the two sets of feed rollers and means for bringing the material held between the feed rollers into the path of the cutting means.

23. In a cutting machine two stationary feed rollers and two spring actuated feed rollers, pressed against the stationary feed rollers, all feed rollers positively driven and disposed in a unit turnable about an axis parallel to the axis of the feed rollers.

24. In a cutting machine a feed roller system, form cutting means, means for starting and interrupting the form cutting of the material and the same means for starting and stopping the feeding of the material.

25. In a cutting machine in combination a master pattern, a feed roller system, form cutting means moved back and forth over the material by said master pattern, a transverse cutting mechanism and means for bringing the material in the feed roller system into the path of the said form cutting means.

26. In a cutting machine the combination of a master pattern, form cutting means moved transversely to the feed of the material by the said master pattern, feeding means and the identical means both for starting or interrupting the form cutting and for starting or stopping the feeding of the material.

27. In a cutting machine feed rollers, form cutting means movable transversely to the feed of the material, a master pattern effectuating said movement and a transverse cutting mechanism disposed so that the material travels approximately in a vertical direction.

28. In a cutting machine a reciprocating table, tripping means fastened to said table, a cam engaged by said tripping means, a stationary transverse cutting knife and a movable transverse cutting knife, pivoted to the stationary transverse cutting knife and actuated by the said cam.

29. In a cutting machine a stationary transverse cutting knife, a movable knife operating together with the stationary knife, a spring for pressing one end and actuating means with oblique pull for pressing the other end of the movable knife against the stationary knife.

30. In a cutting machine a reciprocating work stacking table for receiving the cut off pieces, feeding means for moving the material through the machine, a transverse cutting mechanism and a dash plate to catch the end of the cut off pieces and to assist in laying up smoothly the cut off pieces on said work stacking table.

31. In a cutting machine feeding means, for moving the material with constant speed through the machine, a transverse cutting mechanism and a channel disposed between said feeding mechanism and said transverse cutting mechanism for receiving the material fed by said feeding means during the time consumed in cutting off.

32. In a cutting machine a form cutting mechanism comprising a frame, a stationary knife fastened to said frame, a movable form cutting knife, working together with said stationary form cutting knife, a carrier for said movable form cutting knife, means for rotating one end of said carrier and a swing lever pivoted to said frame, said carrier being pivoted to and guided by said swing lever causing said movable form cutting knife to describe nearly circular curves.

33. In a cutting machine a movable form cutting knife, a crankshaft driving the same, a pair of gears, an actuating shaft driving one of said gears yet sliding easily in it and means for moving the form cutting mechanism on the said actuating shaft.

34. In a cutting machine two cutting mechanisms actuated by the same means and means for moving said cutting mechanisms independently of each other, one of these means being located inside of the other means.

In testimony whereof I hereunto affix my signature.

LORENZ KONRAD BRAREN.